April 25, 1939.  R. C. JACOBS  2,156,091
AUTOMOBILE VISOR BRACKET
Filed June 16, 1937
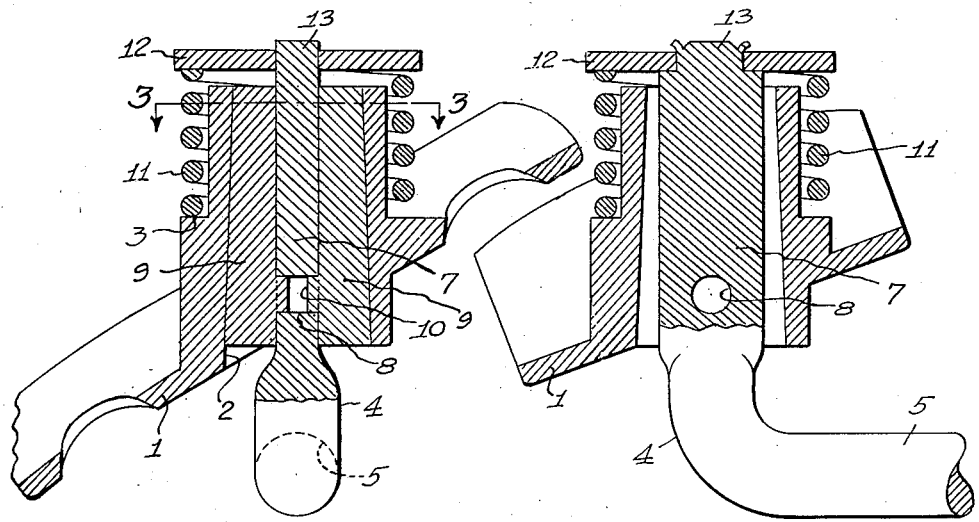
Fig. 1.  Fig. 2.
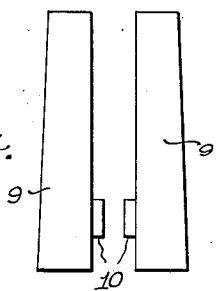
Fig. 4.
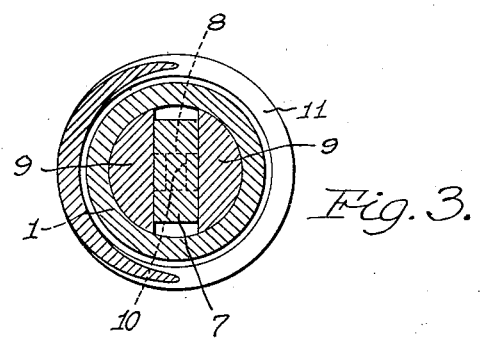
Fig. 3.
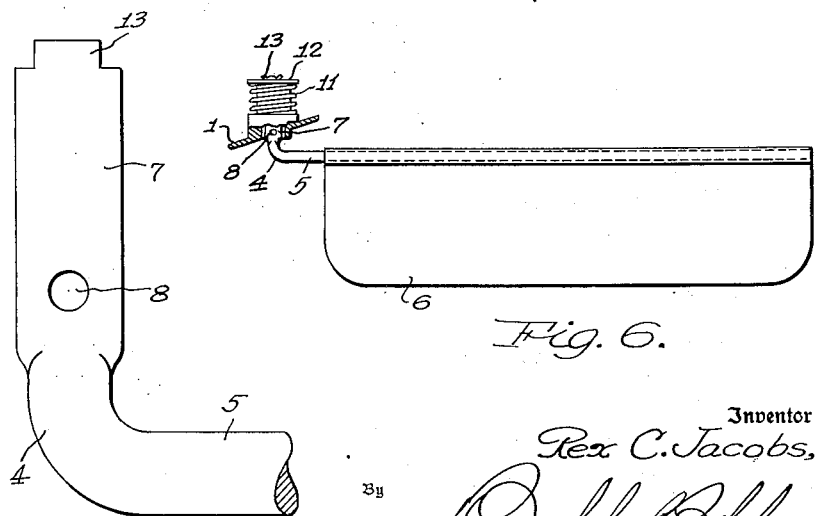
Fig. 5.  Fig. 6.
Inventor
Rex C. Jacobs,
By
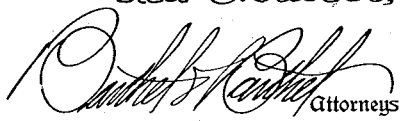
Attorneys Patented Apr. 25, 1939

2,156,091

UNITED STATES PATENT OFFICE 2,156,091

AUTOMOBILE VISOR BRACKET

Rex C. Jacobs, Detroit, Mich.

Application June 16, 1937, Serial No. 148,550

3 Claims. (Cl. 248—288)

The present invention relates to a mounting device for glare shields or sun visors and has for its primary object to provide an improved device of this character for supporting a glare shield or visor in an automobile whereby adjustment movement of the shield or visor to various desired positions adjacent the windshield or side window of the automobile may be easily accomplished.

Another object of the invention is to provide a glare shield embodying a bracket having a conical seat for the reception of a conical bearing head on a bent arm, and means for holding the conical bearing head in the conical seat whereby the free end of the bent arm, upon which the glare shield is mounted, may be swung in a substantially horizontal arc. The bent arm is supported by the conical bearing head in such manner that it may pivot to a limited extent with respect thereto, the axis of such pivotal movement being perpendicular to the substantially vertical pivot around which the free end of the arm swings during movement in its substantially horizontal arc.

More particularly, the mounting device comprises a bracket having a conical seat, a bent arm having a flattened portion, and a conical bearing head composed of two complemental halves. The flattened end of the bent arm is pivotally supported by the complemental conical head parts, and the latter are held in the conical seat by a spring. The spring tends to draw the conical bearing head into the conical seat and thus induces friction which holds the swinging end of the arm in various positions of adjustment. The flattened end of the bent arm is received between the two conical bearing head halves and as the halves are drawn into the tapered socket, friction is induced to resist its movement about its pivotal mounting in the head. Further, the socket is so constructed that the pivotal movement relative to its bearing head is restricted. Movement is permitted to an extent whereby the operator may adjust the shield to higher or lower positions incident to its adjustment movement in its horizontal arc, but accidental or inadvertent lowering of the shield to positions where it might totally obstruct vision of a vehicle operator in an emergency is prevented.

With the above and other ends in view the invention is more fully disclosed with reference to the accompanying drawing, in which Figure 1 is a vertical section of a mounting device;

Fig. 2 is a vertical section at right angles to Fig. 1;

Fig. 3 is a section taken on the line 3—3 of Fig. 1;

Figs. 4 and 5 are elevations of details, and

Fig. 6 illustrates a glare shield supported by the supporting device.

Like characters of reference are employed throughout to designate corresponding parts.

The numeral 1 designates a bracket having a tapered socket 2 and an external shoulder 3. A bent arm 4 has an elongate portion 5 upon which the glare shield or visor 6 is mounted for swinging movement thereabout, in the manner already known to the art. The other portion 7 of the bent arm is flattened and is provided with an aperture 8. A conical bearing head is composed of two complemental halves 9, and each half has a pintle 10. The two halves 9, when assembled, are placed on opposite sides of the flattened portion 7 with their pintles 10 projecting into the aperture 8. The conical bearing head is then inserted in the socket 2 and the halves are confined thereby whereby the pintles 10 are maintained in the aperture 8.

The conical bearing head is held in the socket 2 by a coiled spring 11 which is compressed between the shoulder 3 and a washer 12 on the upper end 13 of the bent arm. The spring acts to draw the bearing head into the socket to cause friction which holds the head in various positions of adjustment. The bearing head halves are also tightly wedged against the flattened portion of the bent arm and their frictional contact therewith holds the arm portion against pivoting about the pintles 10. Pivotal movement of the arm portion 7 about the pintles 10 is positively prevented by engagement of the upper end thereof with the wall of the socket 2.

From the foregoing it becomes apparent that the mounting device permits three distinct adjustment movements of the shield. It may be swung about a horizontal axis composed of the arm portion 5, it may be swung in a horizontal arc about the axis of the socket 2, and the arm portion 5 may be moved in a restricted vertical arc about the axes of the pintles 10.

Although a specific embodiment of the invention has been illustrated and described it will be understood that various changes may be made within the scope of the appended claims without departing from the spirit of the invention, and such changes are contemplated.

What I claim is:—

1. In a glare shield mounting device, an arm for supporting the shield and having an end portion provided with opposed sockets, a supporting member, a pair of oppositely disposed complementary bearing members frictionally engaging and pivotally mounted on said supporting member, said end portion extending between said bearing members, said bearing members having opposed pintles engaging respectively in said sockets.

2. In a glare shield mounting device, an arm for pivotally supporting the glare shield, said arm having an end portion provided with flattened sides and having a transverse aperture opening at its opposite ends through said sides, a pair of bearing members engaging respective sides of said end portion and having opposed pintles pivotally received in opposite ends of said aperture, a supporting member having a socket receiving said bearing members, said bearing members being pivotally supported in said socket, and means to retain said bearing members in said socket.

3. In a glare shield mounting device, a tapered socket member, a pair of tapered bearing members journaled in said socket member and having opposed flattened surfaces, an arm for supporting the glare shield, said arm having an end portion positioned between said bearing members and having opposite flattened surfaces engaging respectively the opposed flattened surfaces of said bearing members, said end portion having a transverse aperture therethrough, said bearing members having opposed bearing portions extended from the flattened surfaces thereof and pivotally received in said aperture to lock said arm to said bearing members for rotation therewith and to provide for pivotal movement of said arm relative to said bearing members.

REX C. JACOBS.